June 8, 1926.
J. R. WADE
1,588,213
DIRIGIBLE SPOTLIGHT
Original Filed Sept. 25, 1923
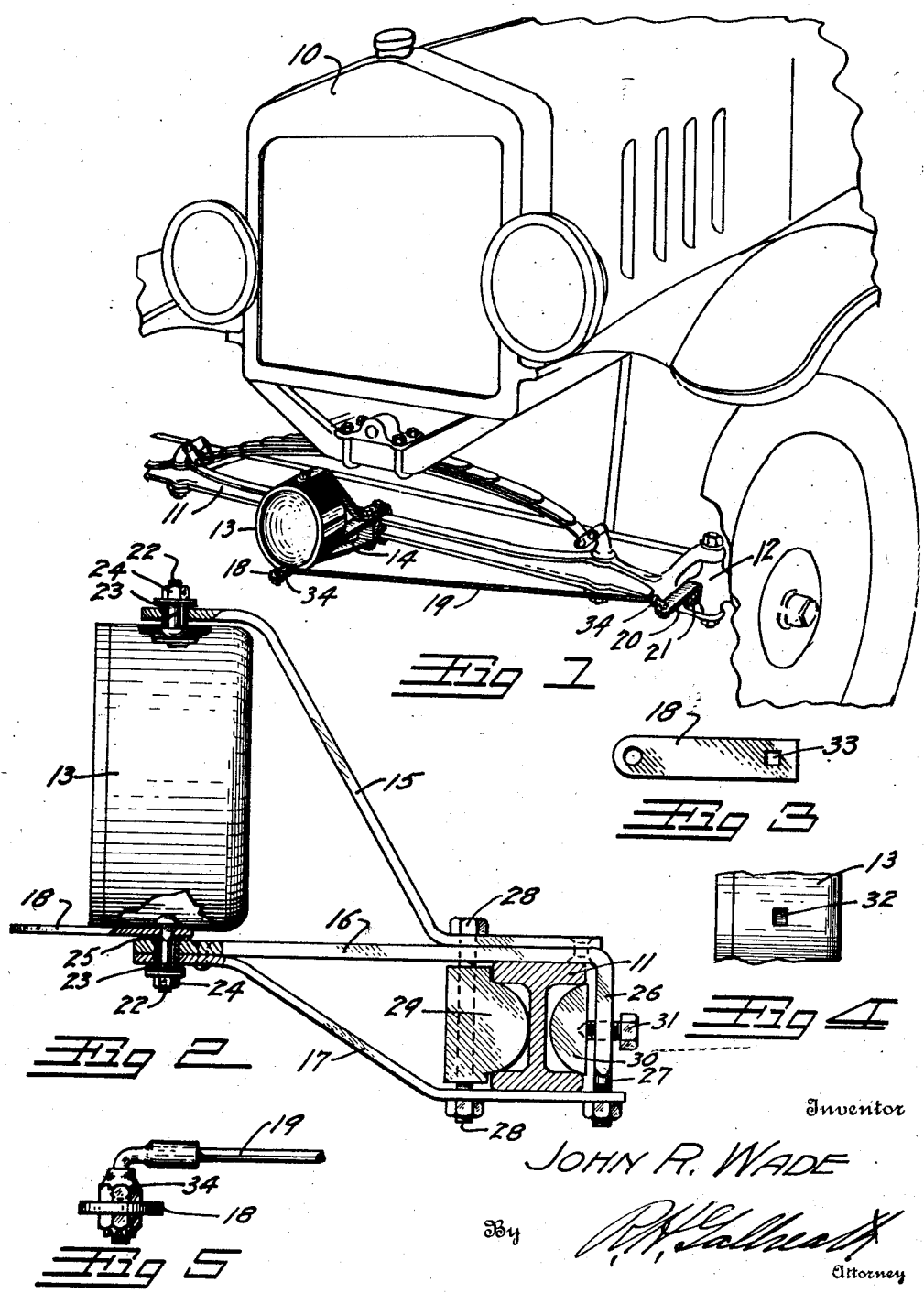
Inventor
JOHN R. WADE
By
Attorney Patented June 8, 1926.

1,588,213

UNITED STATES PATENT OFFICE.

JOHN R. WADE, OF DENVER, COLORADO, ASSIGNOR TO WILLIAM H. ZEH, OF DENVER, COLORADO.

DIRIGIBLE SPOTLIGHT.

Application filed September 25, 1923, Serial No. 664,724. Renewed April 12, 1926.

This invention relates to spot lights of the type arranged to be controlled automatically by the movements of the steering mechanism of an automobile and has for its principal object the provision of a device of this character which will be economical to manufacture, have a minimum of parts and which will withstand the excessive vibration to which a device of this kind is subject without becoming loosened from the automobile or from its various connected parts.

Another object is to provide a bearing support above and below the light housing so that there will be no bending strains on the lamp supporting bearings.

Other objects and advantages reside in the detail construction of the invention which result in simplicity, economy and efficiency and which will become more apparent from the following description.

In the following detailed description of the invention reference is had to the accompanying drawing which forms a part hereof. Like numerals refer to like parts in all views of the drawing and throughout the description.

In the drawing:

Fig. 1 is a fragmentary perspective view of an automobile showing the invention in place.

Fig. 2 is a cross section through the front axle of an automobile showing a side elevation of the light and its supporting bracket, partly broken away to show the interior construction.

Fig. 3 is a detail view of the lever arm which transmits motion to the lamp housing.

Fig. 4 is a detail view showing the opening formed in the lamp housing for securing the bearings thereto.

Fig. 5 is a detail view of the connection between the connecting rod and the lever arms.

Let the numeral 10 designate an automobile, the numeral 11 the front axle thereof and the numeral 12 the steering spindle body.

The invention comprises a lamp housing 13, supported on the axle 11 of the automobile 10 by means of a bracket 14 of special construction, comprising an upper brace 15, a middle arm 16, and a lower brace 17.

The lamp housing 13 is rotated by a lever arm 18 which is held in fixed relation thereto. The motions of the steering mechanism of the automobile are transmitted to the lever arm 18 through the medium of a connecting rod 19 and a second lever arm 20, which is secured to the steering spindle body 12 under the spindle arm nut 21 of the automobile.

Two square openings 32 are made diametrically opposite in the lamp housing 13. Bolts 22, having a square shank under the head, are passed out through these openings. Bushings 23, preferably of bronze, are placed around the bolts 22 and clamped against the lamp housing by means of nuts 24. The bushings 23 pass through vertically opposite openings in the bracket 14 which form bearings for the light. The lever arm 18 is provided with a square opening 33 which is placed over the lower bolt 22 before the bushing 23 is put in place, so that its square opening will engage the square shank of the bolt.

It will be noted that when the nuts 24 are tightened, the bushings are clamped tightly against the lamp housing so as to revolve therewith. All wear caused by the revolving lamp housing will therefore come between the bushings and the supporting bracket and not on the lamp housing or bolts. These bushings are made sufficiently large to give long life to the bearings. Any movement of the lever arm 18 is, of course, transmitted to the lamp housing since they are both secured on the square portion of the lower bolt 22.

A washer 25 is placed between the lever arm 18 and the supporting bracket to carry the weight of the lamp housing.

The construction above described makes it possible for a single bolt to secure the lever arm and the lower bearing to the lamp housing without other assistance.

The middle arm 16 of the supporting bracket 14 is bent downward near its rearward extremity, as shown at 26, and has a threaded extremity 27 which passes through and clamps the lower brace 17 to the automobile axle 11. The upper brace 15 is brought down and secured to the middle arm 16 and a bolt 28 is passed through both the brace and the arm directly ahead of the axle 11. The bolt 28 passes through the lower brace 17 and serves to also clamp the bracket to the axle.

The usual axle is I beam in cross section and to prevent the bracket from loosening thereon a block 29 is placed over the bolt 28 which has a projecting side that wedges into the forward channel of the axle 11. A wedge 30 is forced into the rearward channel of the axle 11 by means of a set screw 31 which is threaded into the downward turned portion 26 of the brace 16. Thus the bracket 14 is clamped against the top and bottom of the axle by means of the bolt 28, and the threaded extremity 27, and against and within the sides of the axle by the set screw 31. This construction has been found necessary owing to the constant and excessive vibration of the axle.

Ball and socket joints 34 are provided at each extremity of the connecting rod 19 to allow universal movement thereof.

In the drawing the bracket 14 is shown secured in the middle of the axle 11, it may, however, be secured at any desired position on the axle either to the right or left, the connecting rod 19 being made of the proper length to suit the desired position.

If desired, two spot-lights could be used on the same axle, one on each side of the center, one being operated by the left hand steering spindle and one by the right hand. No change need be made in the present construction since the invention is interchangeable for either end of the axle 11.

While a specific form of the improvement has been described and illustrated herein, it is desired to be understood that the same may be varied, within the scope of the appended claim, without departing from the spirit of the invention.

Having thus described the invention what I claim and desire to secure by Letters Patent is:—

The combination with a dirigible spot light having two vertically disposed diametrically opposite bearings, of a supporting bracket having journals for said bearings and means for securing said bracket to the front axle of an automobile, said means comprising bolts and nuts for clamping said bracket against the top and bottom of said axle; wedge shaped blocks for engaging the sides of said axle and a set screw for forcing said blocks into engagement with said axle.

In testimony whereof, I affix my signature.

JOHN R. WADE.